Patented Aug. 24, 1937

2,090,941

UNITED STATES PATENT OFFICE 2,090,941

RECOVERY OF AMMONIA AND AMINES FROM THEIR SALTS WITH ORGANIC ACIDS

Henry Dreyfus, London, and Horace Finningley Oxley and Edward Boaden Thomas, Spondon, near Derby, England, assignors to Celanese Corporation of America, a corporation of Delaware No Drawing. Application March 22, 1935, Serial No. 12,438. In Great Britain April 4, 1934

10 Claims. (Cl. 260—122)

This invention relates to the recovery of ammonia and aliphatic amines from their salts with organic acids.

According to the invention we recover ammonia or aliphatic amines from their salts with organic acids by thermally decomposing the salts into their acidic and basic constituents, and separating these constituents one from the other concurrently with their formation.

The decomposition of the salts may be carried out at temperatures above 80° C. or 100° C. and particularly temperatures between about 125° C. and 150° C. or 160° C., temperatures between about 140° C. and 150° C. being specially useful. Advantageously the salts may be subjected to the decomposition in aqueous solution.

The decomposition and concurrent separation of the constituents may be effected under normal atmospheric pressure or pressures lower than atmospheric, for example pressures of half an atmosphere or less. Higher pressures may be employed if desired but in general it is preferred to employ pressures not substantially exceeding atmospheric.

The method employed for separating the acid and the amine or ammonia concurrently with the decomposition of the salt will depend inter alia on the nature and properties of the acid and amine or ammonia. For example, when there is a considerable difference in volatility between the acid and the basic component, as in the case of ammonia, methylamine or ethylamine and acetic acid, the acid and the base may be separated by simple fractional distillation concurrently with their production by the decomposition of the salt. When the difference in volatility is small the fractionation may be aided by employing a substance forming an azeotropic mixture with either the acid or the amine. For example, when a mixture of ethylene-diamine and acetic acid is obtained by the thermal decomposition of ethylene-diamine acetate, these two substances may be separated with the aid of a substance forming an azeotropic mixture with acetic acid such, for example, as toluene or tetrachlorethylene.

The recovery of ammonia and simple substituted ammonias, for example methylamine, from their salts with lower fatty acids is facilitated by the tendency of such acids to combine, under the reaction conditions, more or less loosely with the undecomposed salts to form acid salts, from which the free acids may be regenerated by heating to a higher temperature and/or under reduced pressure. Acid amides formed from the salt in the latter operation may be hydrolyzed back to the corresponding ammonium or substituted ammonium salts; for example they may with advantage be mixed with further quantities of the salts before heating to regenerate ammonia or amine according to the invention.

The thermal decomposition of the salt and the concurrent separation of the products may for instance be carried out by heating an aqueous solution of the salt in a reaction vessel fitted with a fractionating column. For example, methylammonium acetate in aqueous solution of concentration between 20 and 30% may be heated in a still fitted with a fractionating column arranged so that the methylamine set free escapes together with water vapor at the top of the column, while the acetic acid set free and that held as acid methylammonium acetate is retained in the reaction vessel. As the decomposition proceeds, further quantities of methylammonium acetate solution may be added.

When the decomposition is finished and the vapors leaving the top of the column are free from methylamine, the process may be interrupted, the residue in the still withdrawn, and the acetic acid subsequently removed therefrom, for example by distillation under atmospheric pressure. Alternatively the separation of the acid may be carried out in the still itself by continuing the distillation, for example until the temperature exceeds about 200° or 220° C. The methyl acetamide produced may be returned to the process as already described. Similar methods may be applied to other ammonium or simple substituted ammonium salts of lower fatty acids, such as ammonium acetate, ethylammonium acetate, ammonium propionate, etc.

The process of the invention may be operated continuously, especially when little or no acid salt is formed. For example, the amine salt may be heated in aqueous solution or otherwise in a still fitted with a fractionating column designed and maintained at suitable temperatures for the separation of the two constituents. For example ethylene-diamine and acetic acid obtained by the decomposition of the acetate of ethylene-diamine may be separated in this way with the aid of a substance forming an azeotropic mixture with the acid, the ethylene-diamine being removed at a point below the top of the column, for example a point about halfway down the column. As the distillation proceeds, further quantities of the solution of the salt may be introduced into the still and the process operated continuously.

As already indicated the salts are with advantage decomposed in aqueous solution. If desired, however, they may be heated in solution or suspension in other inert liquids, for instance in liquids whose vapors form an azeotropic mixture with one of the decomposition products; it is also possible to treat the salts in the solid phase, but temperature control is then more difficult.

The invention may be applied generally to the recovery of ammonia or amines and/or acidic constituents from ammonium or substituted ammonium salts or salts of other amines with organic acids, especially salts in which the basic and/or the acidic constituent is volatile. Among the acids whose salts may be treated according to the invention are the lower fatty acids such as acetic acid and propionic acid, dibasic acids such as oxalic acid and succinic acid, hydroxy-acids such as tartaric acid, and unsaturated acids such as maleic acid. Moreover, salts of secondary and tertiary amines, as well as primary amines, may be treated according to the invention.

The following example illustrates the invention but does not limit it in any way.

*Example*

2 kgms. of a 20% ammonium acetate solution are heated in a still provided with a fractionating column. Considerable quantities of ammonia are evolved with an increasing proportion of water vapor as the temperature rises. The ammonia is absorbed in water or otherwise collected.

When the temperature of the liquid in the still reaches 140° C., a further 8 kgms. of the same solution is fed continuously into the still, the temperature of the liquid being maintained between 140° and 150° C. A suitable reflux ratio is 4:1. After all the ammonium acetate solution has been added and the evolution of ammonia ceases, the temperature of the liquid is again allowed to rise, and the acetic acid given off is condensed and collected. When the temperature reaches 210° C. the distillation is stopped and the residue, consisting mainly of acetamide, is allowed to cool. A suitable quantity of 20% ammonium acetate solution is then added to the cooled residue in the still and a fresh cycle begun.

By "reflux ratio" is meant a ratio between the amount of material vaporized in the still and the amount escaping from the dephlegmator.

What we claim and desire to secure by Letters Patent is:—

1. Process for recovering nitrogen-containing bases selected from the group consisting of ammonia and lower alkylamines from their salts with lower aliphatic carboxylic acids, which comprises heating the salt in aqueous solution to a temperature at which at least one of the components of the salt is set free, and concurrently collecting the ammonia or the lower alkylamine in a form substantially free from the acid.

2. Process for recovering nitrogen-containing bases selected from the group consisting of ammonia and lower alkylamines from their salts with lower aliphatic carboxylic acids, which comprises heating the salt in aqueous solution to a temperature at which at least one of the components of the salt is set free, concurrently subjecting the products of the decomposition to distillation, and collecting the ammonia or the lower alkylamine in a form substantially free from the acid.

3. Process for recovering nitrogen-containing bases selected from the group consisting of ammonia and its lower mono-alkyl substitution products from their salts with lower fatty acids, which comprises boiling an aqueous solution of the salt, and concurrently removing in the vapor phase the base set free.

4. Process for recovering nitrogen-containing bases selected from the group consisting of ammonia and its lower mono-alkyl substitution products from their salts with lower fatty acids, which comprises boiling an aqueous solution of the salt until the temperature of the solution reaches 140° to 150° C., concurrently removing in the vapor phase the base set free and adding further quantities of the aqueous solution as the decomposition proceeds.

5. Process for recovering nitrogen-containing bases selected from the group consisting of ammonia and its lower mono-alkyl substitution products from their salts with lower fatty acids, which comprises boiling an aqueous solution of the salt until the temperature of the solution reaches 140° to 150° C., concurrently removing in the vapor phase the base set free, and, as the decomposition proceeds, adding such further quantities of the aqueous solution that the temperature is maintained between 140° and 150° C.

6. Process for recovering nitrogen-containing bases selected from the group consisting of ammonia and its lower mono-alkyl substitution products from their salts with lower fatty acids, which comprises boiling an aqueous solution of the salt, concurrently removing in the vapor phase the base set free, and heating the residue under conditions of temperature and pressure such that the acid is liberated.

7. Process according to claim 6, wherein the mass remaining after the liberation of the acid is mixed with a further quantity of the aqueous solution from which the base is to be recovered.

8. Process for recovering nitrogen-containing bases selected from the group consisting of ammonia and its lower mono-alkyl substitution products from their salts with lower fatty acids, which comprises boiling an aqueous solution of the salt until the temperature of the solution reaches 140° to 150° C., concurrently removing in the vapor phase the base set free, adding further quantities of the aqueous solution as the decomposition proceeds, and subsequently heating the residue under conditions of temperature and pressure such that the acid is liberated.

9. Process for recovering nitrogen-containing bases selected from the group consisting of ammonia and its lower mono-alkyl substitution products from their salts with lower fatty acids, which comprises boiling an aqueous solution of the salt until the temperature of the solution reaches 140° to 150° C., concurrently removing in the vapor phase the base set free, adding further quantities of the aqueous solution as the decomposition proceeds, and subsequently heating the residue until the temperature exceeds 220° C. to liberate the acid.

10. Process according to claim 9, wherein the mass remaining after the liberation of the acid is mixed with a further quantity of the aqueous solution from which the base is to be recoverd.

HENRY DREYFUS.
HORACE FINNINGLEY OXLEY.
EDWARD BOADEN THOMAS.